United States Patent
Watanabe

(10) Patent No.: US 9,887,418 B2
(45) Date of Patent: Feb. 6, 2018

(54) NEGATIVE ELECTRODE MATERIAL FOR LITHIUM-ION SECONDARY BATTERY, NEGATIVE ELECTRODE FOR LITHIUM-ION SECONDARY BATTERY, LITHIUM-ION SECONDARY BATTERY, AND METHOD OF PRODUCING NEGATIVE ELECTRODE MATERIAL FOR LITHIUM-ION SECONDARY BATTERY

(71) Applicant: SHIN-ETSU CHEMICAL CO., LTD., Tokyo (JP)

(72) Inventor: Koichiro Watanabe, Annaka (JP)

(73) Assignee: SHIN-ETSU CHEMICAL CO., LTD., Annaka-Shi, Gunma (JP)

( * ) Notice: Subject to any disclaimer, the term of this patent is extended or adjusted under 35 U.S.C. 154(b) by 173 days.

(21) Appl. No.: 14/636,835

(22) Filed: Mar. 3, 2015

(65) Prior Publication Data
US 2015/0295232 A1    Oct. 15, 2015

(30) Foreign Application Priority Data

Apr. 14, 2014 (JP) ................. 2014-082713

(51) Int. Cl.
| | |
|---|---|
| H01M 4/36 | (2006.01) |
| H01M 4/38 | (2006.01) |
| H01M 4/04 | (2006.01) |
| H01M 4/1395 | (2010.01) |
| H01M 4/134 | (2010.01) |
| H01M 10/0525 | (2010.01) |
| H01M 4/583 | (2010.01) |
| H01M 4/62 | (2006.01) |
| H01M 4/66 | (2006.01) |
| H01M 4/02 | (2006.01) |

(52) U.S. Cl.
CPC ......... *H01M 4/366* (2013.01); *H01M 4/0404* (2013.01); *H01M 4/134* (2013.01); *H01M 4/1395* (2013.01); *H01M 4/364* (2013.01); *H01M 4/386* (2013.01); *H01M 10/0525* (2013.01); *H01M 4/583* (2013.01); *H01M 4/622* (2013.01); *H01M 4/625* (2013.01); *H01M 4/661* (2013.01); *H01M 2004/021* (2013.01); *H01M 2004/027* (2013.01)

(58) Field of Classification Search
CPC .............. H01M 4/1395; H01M 4/386
See application file for complete search history.

(56) References Cited

U.S. PATENT DOCUMENTS

| | | |
|---|---|---|
| 5,395,711 A | 3/1995 | Tahara et al. |
| 6,383,686 B1 | 5/2002 | Umeno et al. |
| 2003/0129494 A1 | 7/2003 | Kaneda et al. |
| 2009/0181304 A1 | 7/2009 | Miyamoto et al. |
| 2011/0097629 A1* | 4/2011 | Yew ............... H01M 4/134 429/231.8 |
| 2012/0282524 A1* | 11/2012 | Kono ............... H01M 4/525 429/223 |

FOREIGN PATENT DOCUMENTS

| | | |
|---|---|---|
| JP | H05-174818 A | 7/1993 |
| JP | H06-60867 A | 3/1994 |
| JP | H10-294112 A | 11/1998 |
| JP | H11-102705 A | 4/1999 |
| JP | 2997741 B2 | 1/2000 |
| JP | 2000-215887 A | 8/2000 |
| JP | 2000-243396 A | 9/2000 |
| JP | 2002-042806 A | 2/2002 |
| JP | 2007-188872 A | 7/2007 |
| JP | 2013-171629 A | 9/2013 |
| WO | 2006/123601 A1 | 11/2006 |

OTHER PUBLICATIONS

Mar. 7, 2017 Office Action issued in Japanese Patent Application No. 2014-082713.
Lee et al.; "Nitrogen-doped carbon coating for a high-performance SiO anode in lithium-ion batteries;"Electrochemistry Communications; 34; 2013; pp. 98-101.

* cited by examiner

*Primary Examiner* — Matthew J Merkling
(74) *Attorney, Agent, or Firm* — Oliff PLC

(57) ABSTRACT

The present invention provides a negative electrode material for a lithium-ion secondary battery, the negative electrode material comprising silicon active material particles containing silicon and nitrogen, the silicon active material particles being capable of occluding and emitting lithium ions, wherein an amount of the nitrogen contained in each silicon active material particle is in the range from 100 ppm to 50,000 ppm, a negative electrode and lithium-ion secondary battery using the material, and a method of producing the material. The negative electrode material is suitable for a lithium-ion secondary battery negative electrode that has high first charge and discharge efficiency and excellent cycle performance and makes the best use of high battery capacity and low volume expansion rate of a silicon material such as a silicon oxide material.

8 Claims, No Drawings

US 9,887,418 B2

NEGATIVE ELECTRODE MATERIAL FOR LITHIUM-ION SECONDARY BATTERY, NEGATIVE ELECTRODE FOR LITHIUM-ION SECONDARY BATTERY, LITHIUM-ION SECONDARY BATTERY, AND METHOD OF PRODUCING NEGATIVE ELECTRODE MATERIAL FOR LITHIUM-ION SECONDARY BATTERY

BACKGROUND OF THE INVENTION

Field of the Invention

The present invention relates to a negative electrode material for a lithium-ion secondary battery, a negative electrode for a lithium-ion secondary battery, a lithium-ion secondary battery, and a method of producing a negative electrode material for a lithium-ion secondary battery.

Description of the Related Art

As mobile devices such as mobile electronic devices and mobile communication devices have highly developed, secondary batteries with higher energy density are needed to improve efficiency and reduce the size and weight of the devices.

The capacity of the secondary batteries of this type can be improved by known methods: use of a negative electrode material made of an oxide of V, Si, B, Zr or Sn, or a complex oxide thereof (See Patent Documents 1 and 2, for example); use of a negative electrode material made of a metal oxide subjected to melting and rapid cooling (See Patent Document 3, for example); use of a negative electrode material made of a silicon oxide (See Patent Document 4 for example); use of a negative electrode material made of $Si_2N_2O$ and $Ge_2N_2O$ (See Patent Document 5 for example), and others.

The negative electrode materials can be made conductive by known methods: performing pressure welding of SiO and graphite, and carbonizing the resultant (See Patent Document 6, for example); coating silicon particles with carbon layers by chemical vapor deposition (See Patent Document 7, for example); coating silicon oxide particles with carbon layers by chemical vapor deposition (See Patent Document 8, for example).

Although these conventional methods increase the charging and discharging capacity and energy density to some extent, the increase is insufficient for market needs and the cycle performance fails to fulfill the needs. The conventional methods need to further improve the energy density and thus are not entirely satisfactory.

Patent Document 4 discloses use of a silicon oxide as a negative electrode material for a lithium-ion secondary battery so as to obtain an electrode with a high capacity. To the present inventor's knowledge, however, this method cannot achieve low irreversible capacity at first charging and discharging and a practical level of cycle performance; this method can be improved on to solve these problems.

The methods to provide a negative electrode material with conductivity remains the following problems. The method in Patent Document 6 uses solid-state welding and thus cannot uniformly form a carbon coating, resulting in insufficient conductivity.

Although the method in Patent Document 7 enables the formation of a uniform carbon coating, this method uses Si as a negative electrode material and thus reduces the cycle performance because the expansion and contraction of the material becomes too large at lithium insertion or extraction. This makes the material unsuited to practical use. The charging capacity consequently needs to be limited to avoid this problem. Although the method in Patent Document 8 enables the improvement in cycle performance, the material produced by this method lacks the precipitation of silicon fine particles and the conformity with the structure of a carbon coating, and thus is unpractical for use in secondary batteries. This material causes the batteries to gradually reduce the capacity with an increase in charging and discharging cycles and to greatly reduce the capacity after given cycles.

There is accordingly a need for development of a negative electrode material useful for a lithium-ion secondary battery having high first charge and discharge efficiency and excellent cycle performance and taking advantage of a silicon oxide material having high battery capacity and low volume expansion rate.

CITATION LIST

Patent Literature

[Patent Document 1] Japanese Patent Application Publication No. H05-174818
[Patent Document 2] Japanese Patent Application Publication No. H06-60867
[Patent Document 3] Japanese Patent Application Publication No. K10-294112
[Patent Document 4] Japanese Patent No. 2997741
[Patent Document 5] Japanese Patent Application Publication No. H11-102705
[Patent Document 6] Japanese Patent Application Publication No. 2000-243396
[Patent Document 7] Japanese Patent Application Publication No. 2000-215887
[Patent Document 8] Japanese Patent Application Publication No. 2002-42806

SUMMARY OF THE INVENTION

The present invention was accomplished in view of the above problems, and it is an object of the present invention to provide a negative electrode material suitable for a lithium-ion secondary battery negative electrode that has higher capacity and excellent cycle performance and makes the best use of low volume expansion rate of a silicon material such as a silicon oxide material, and a negative electrode and lithium-ion secondary battery using the negative electrode material, and a method of producing a negative electrode material.

To achieve this object, the present invention provides a negative electrode material for a lithium-ion secondary battery, the negative electrode material comprising silicon active material particles containing silicon and nitrogen, the silicon active material particles being capable of occluding and emitting lithium ions, wherein an amount of the nitrogen contained in each silicon active material particle is in the range from 100 ppm to 50,000 ppm.

The negative electrode material, which including the silicon active material particles containing the above amount of nitrogen, has higher capacity, excellent cycle performance, and acceptable charge and discharge efficiency. If the nitrogen content in each silicon active material particle is less than 100 ppm, the cycle performance cannot be improved; if the nitrogen content is more than 50,000 ppm, the battery capacity may be decreased.

The silicon active material particles are preferably selected from the group consisting of silicon particles, particles with composite structure in which silicon fine particles are dispersed into a silicon compound, silicon oxide particles expressed by a general formula of $SiO_x$ where $0.5 \leq x \leq 1.6$, and a mixture of two or more thereof.

Use of these silicon active material particles enables production of a negative electrode material for a lithium-ion secondary battery having higher first charge and discharge efficiency, higher capacity, and excellent cycle performance.

Each silicon active material particle is preferably coated with a carbon coating.

The negative electrode material including the silicon active material particles coated with the carbon coatings has excellent conductivity and enables a lithium-ion secondary battery to have better battery characteristics.

The silicon active material particles are preferably subjected to chemical vapor deposition to deposit carbon thereon at a temperature ranging from 600° C. to 1200° C. under an organic gas and/or steam atmosphere capable of producing carbon by pyrolysis, whereby each silicon active material particle is coated with the carbon coating.

These silicon active material particles, coated with carbon under conditions of the above temperature and atmosphere, can inhibit the enlargement of their silicon crystal, thereby enabling the inhibition of their expansion at charging. The characteristics of the negative electrode material, particularly the cycle performance, can consequently be improved more reliably.

The organic gas and/or steam atmosphere capable of producing carbon by pyrolysis is preferably made of at least one raw material selected from the group consisting of methane, ethane, ethylene, acetylene, propane, butane, butene, pentane, isobutane, hexane, benzene, toluene, xylene, styrene, ethylbenzene, diphenylmethane, naphthalene, phenol, cresol, nitrobenzene, chlorobenzene, indene, cumarone, pyridine, anthracene, phenanthrene, a gas light oil obtained by a tar distillation process, a creosote oil, an anthracene oil, and a naphtha-cracked tar oil.

The silicon active material particles having the carbon coatings formed by pyrolzing such a raw material enable the battery capacity, the first charge and discharge efficiency, and the cycle performance to be further improved by these carbon coatings having better characteristics.

To achieve the above object, the present invention also provides a negative electrode for a lithium-ion secondary battery using any one of the above negative electrode materials.

Such a negative electrode enables a lithium-ion secondary battery to have higher battery capacity, higher charge and discharge efficiency, and excellent cycle performance.

To achieve the above object, the present invention also provides a lithium-ion secondary battery using the above negative electrode.

Such a lithium-ion secondary battery has higher battery capacity, higher charge and discharge efficiency, and excellent cycle performance.

To achieve the above object, the present invention also provides a method of producing a negative electrode material for a lithium-ion secondary battery, the negative electrode material containing silicon active material particles that contain silicon and are capable of occluding and emitting lithium ions, the method comprising a nitrogen introducing step of heating the silicon active material particles in a heating apparatus while supplying a nitrogen source thereto and adjusting the temperature in the heating apparatus and the amount of the nitrogen source such that each silicon active material particle contains nitrogen in an amount ranging from 100 ppm to 50,000 ppm.

Adjusting the carbon content of the silicon active material particles, contained in the negative electrode material, in the above range enables production of a negative electrode material allowing a lithium-ion secondary battery to have higher capacity, acceptable charge and discharge efficiency, and excellent cycle performance. The inventive producing method is not particularly complicated but easy to perform; this method is applicable to industrial scale production.

The nitrogen introducing step is preferably performed under a nitrogen gas atmosphere while the temperature in the heating apparatus is adjusted in the range from 600° C. to 1200° C.

In this manner, the carbon content can readily be adjusted in the range from 100 ppm to 50,000 ppm.

The nitrogen source to be supplied is preferably selected from a nitrogen gas, ammonia, trimethylamine, and triethylamine.

In the present invention, these nitrogen sources are preferable.

The nitrogen introducing step may include coating each silicon active material particle with a carbon coating in conjunction with allowing each silicon active material particle to contain the nitrogen by supplying a carbon source, together with the nitrogen source, to the heating apparatus.

In this manner, the silicon active material particle can be coated with a conductive carbon coating simultaneously with the adjustment of the nitrogen content of the silicon active material particles, so a negative electrode material suitable for a lithium-ion secondary battery having higher capacity and excellent cycle performance can readily be produced.

The carbon source is preferably composed of at least one raw material selected from the group consisting of methane, ethane, ethylene, acetylene, propane, butane, butene, pentane, isobutane, hexane, benzene, toluene, xylene, styrene, ethylbenzene, diphenylmethane, naphthalene, phenol, cresol, nitrobenzene, chlorobenzene, indene, cumarone, pyridine, anthracene, phenanthrene, a gas light oil obtained by a tar distillation process, a creosote oil, an anthracene oil, and a naphtha-cracked tar oil.

The pyrolysis of these carbon sources can form a carbon coating having better characteristics, thereby enabling production of a negative electrode material suitable for a lithium-ion secondary battery having higher capacity, higher first charge and discharge efficiency, and excellent cycle performance.

The present invention uses a silicon active material containing nitrogen in an amount ranging from 100 ppm to 50,000 ppm as a lithium-ion secondary battery negative electrode material, thereby enabling production of a lithium-ion secondary battery having higher capacity and excellent cycle performance. The inventive method of producing this negative electrode material is not particularly complicated but easy to perform. This method is applicable to industrial scale production.

DETAILED DESCRIPTION OF THE PREFERRED EMBODIMENTS

Hereinafter, embodiments of the present invention will be described, but the present invention is not restricted to these embodiments.

Negative Electrode Material for Lithium-Ion Secondary Battery, and Method of Producing the Material The inventive negative electrode material for use in a lithium-ion secondary battery includes silicon active material particles, each of which is capable of occluding and emitting lithium ions and contains nitrogen in an amount ranging from 100 ppm to 50,000 ppm, and silicon. The nitrogen content of each silicon active material particle can be measured by thermal conductivity method, or other methods.

The inventive method of producing a negative electrode material for a lithium-ion secondary battery includes a nitrogen introducing process of heating silicon active material particles in a heating apparatus while supplying a nitrogen source thereto, so that each silicon active material particle contains nitrogen. In the nitrogen introducing process, the temperature in the heating apparatus and the amount of the nitrogen source are adjusted such that each silicon active material particle contains nitrogen in an amount ranging from 100 ppm to 50,000 ppm.

The inventive method of producing a negative electrode material for a lithium-ion secondary battery begins with the preparation of silicon active material particles, including silicon, that are capable of occluding and emitting lithium ions.

The silicon active material particles (also referred to as silicon-contained particles below), which include silicon and are capable of occluding and emitting lithium ions, are preferably selected from the group consisting of silicon particles, particles with composite structure in which silicon fine particles are dispersed into a silicon compound, silicon oxide particles expressed by a general formula of $SiO_x$ where $0.5 \leq x \leq 1.6$, and a mixture of two or more thereof.

Use of these particles allows the negative electrode material to enable production of a lithium-ion secondary battery having a higher first charge and discharge efficiency, higher capacity, and excellent cycle performance.

The term "silicon oxide" in the invention is a general term for an amorphous silicon oxide; a silicon oxide before disproportionation is expressed by a general formula of $SiO_x$ where $0.5 \leq x \leq 1.6$. In the formula, x preferably satisfies $0.8 \leq x < 1.6$, more preferably $0.8 \leq x < 1.3$. The silicon oxide can be obtained by heating a mixture of silicon dioxide and metallic silicon to produce a silicon monoxide gas and cooling and precipitating the silicon monoxide gas.

The particles with composite structure in which silicon fine particles are dispersed into a silicon compound can be obtained by, for example, the following method: sintering a mixture of silicon fine particles and a silicon compound; or performing a heat treatment on silicon oxide particles, expressed by a general formula of $SiO_x$, before disproportionation under an inert, non-oxidizing atmosphere such as an argon atmosphere at 400° C. or more, preferably 800° C. to 1100° C. to cause a disproportionation reaction. A material obtained particularly by the latter method includes silicon fine particles uniformly dispersed and is thus preferable. This disproportionation reaction enables silicon nanoparticles to have a size of 1 nm to 100 nm. The particles with composite structure in which silicon nanoparticles are dispersed into a silicon oxide preferably contain a silicon dioxide as a silicon oxide. These silicon nanoparticles (crystal) dispersed into an amorphous silicon oxide can be observed by a transmission electron microscope.

The physical properties of the silicon-contained particles may be selected depending on the target particles. For example, the average particle size is preferably 0.1 μm to 50 μm; the minimum particle size is more preferably 0.2 μm, further preferably 0.5 μm; the maximum particle size is more preferably 30 μm, further preferably 20 μm. The term "average particle size" in the invention is a volume average particle size by particle size distribution measurement using laser diffractometry.

The BET specific surface area of the silicon-contained particles is preferably 0.5 to 100 $m^2/g$, more preferably 1 to 20 $m^2/g$. A BET specific surface area of 0.5 $m^2/g$ or more then prevents reduction in battery characteristics due to decrease in adhesion of the negative electrode material when the material is applied to an electrode; a BET specific surface area of 100 $m^2/g$ or less prevents reduction in battery capacity due to a large ratio of silicon dioxide on the particle surface when the negative electrode material is used for a lithium-ion second battery.

The inventive producing method may include a process of making the prepared silicon active material particles conductive to improve the battery characteristics as follows.

Examples of the process of making the silicon active material particles conductive to improve the battery characteristics include mixing the silicon active material particles and conductive particles such as graphite particles; coating each silicon active material particle with a carbon coating; and the combination thereof.

Of the silicon active material particles subjected to the three methods, silicon active material particles each coated with a carbon coating are particularly preferable. A preferable carbon coating method is chemical vapor deposition (CVD).

As described above, the silicon active material particles, included in the inventive negative electrode material for a lithium-ion secondary battery, may be carbon-coated particles whose surface is coated with carbon.

The CVD to form a carbon coating on the surface of the silicon active material particle is preferably performed at a temperature ranging from 600° C. to 1200° C. under an organic gas, an organic steam atmosphere, or an atmosphere of a mixture thereof under which pyrolysis can produce carbon. The CVD is more preferably performed at a temperature ranging from 900° C. to 1100° C.

These silicon active material particles, coated with carbon under conditions of the above temperature and atmosphere, can inhibit the enlargement of their silicon crystal, thereby enabling the inhibition of their expansion at charging. The characteristics of the negative electrode material, particularly the cycle performance, can consequently be improved more reliably.

The CVD may be performed under atmospheric pressure or reduced pressure. The reduced pressure may be 50 Pa to 30,000 Pa. The heating apparatus used to form the carbon coating may be a continuous furnace such as a batch furnace, rotary kiln, or roller hearth kiln, or a common heating apparatus such as a fluidized bed furnace.

Examples of the carbon source to form the carbon coating by the CVD include various organic substances below. The substances to be used may generally vary the pyrolysis temperature, deposition rate, and characteristics of the carbon coating formed after the deposition: substances that have a large deposition rate are likely to make the carbon coating non-uniform; substances that need a higher temperature for pyrolysis may excessively grow silicon crystal in the particles to be coated during the deposition at the higher temperature, resulting in reduction in discharge efficiency and cycle performance.

Examples of the raw material of the organic gas and/or steam atmosphere capable of producing carbon by pyrolysis include methane, ethane, ethylene, acetylene, propane, butane, butene, pentane, isobutane, hexane, benzene, toluene, xylene, styrene, ethylbenzene, diphenylmethane, naphthalene, phenol, cresol, nitrobenzene, chlorobenzene, indene, cumarone, pyridine, anthracene, phenanthrene, a gas light oil obtained by a tar distillation process, a creosote oil, an anthracene oil, and a naphtha-cracked tar oil. These materials may be used singly or in combination depending on the purpose.

The ratio of the mass of the carbon coating to the total mass of the silicon active material particle including the carbon coating is preferably 0.3 to 40 mass %, more preferably 1.0 to 30 mass %. Depending on the particles to be coated, the silicon active material particles having a mass ratio of 0.3 mass % or more can maintain sufficient conductivity. The negative electrode using these particles reliably enables a non-aqueous electrolyte secondary battery to have improved cycle performance. The silicon active material particles having a mass ratio of 40 mass % or less enable a lithium-ion battery with a negative electrode using these particles to significantly inhibit reduction in its charging and discharging capacity due to a large ratio of carbon in the negative electrode material. The silicon active material particles having a mass ratio more than 40 mass % cannot further improve their conductivity by increase in the mass ratio.

The inventive producing method includes a nitrogen introducing process to allow each silicon active material particle to contain nitrogen in an amount ranging from 100 ppm to 50,000 ppm.

The inventive lithium-ion secondary battery includes silicon active material particles each containing nitrogen in an amount ranging from 100 ppm to 50,000 ppm, preferably from 100 ppm to 10,000 ppm, more preferably from 100 ppm to 5,000 ppm.

If the nitrogen content is less than 100 ppm, the cycle performance cannot be improved; if the nitrogen content is more than 50,000 ppm, the battery capacity may be reduced. The carbon content of each silicon active material particle can be measured by thermal conductivity method, or other methods.

The silicon active material particles are placed in the heating apparatus (a reactor) and heated while the nitrogen source is supplied to the heating apparatus so that each silicon active material particle is readily allowed to contain nitrogen. In this process, the nitrogen content of the silicon active material particle can be adjusted as desired by adjusting the temperature (reaction temperature) in the heating apparatus and the amount of the nitrogen source to be supplied.

The inventive producing method thus adjusts the temperature in the heating apparatus and the amount of the nitrogen source to be supplied such that each silicon active material particle contains nitrogen in an amount ranging from 100 ppm to 50,000 ppm.

To achieve this nitrogen content control, the silicon active material particles are preferably heated under a nitrogen atmosphere while the temperature in the heating apparatus is adjusted in the range from 600° C. to 1200° C.

In this manner, the nitrogen content can readily be controlled in the range from 100 ppm to 50,000 ppm.

The nitrogen source is preferably selected from a nitrogen gas, ammonia, and alkylamine such as trimethylamine, and triethylamine. The nitrogen gas is the most preferred source among these.

In the present invention, these nitrogen sources are preferable.

The nitrogen introducing process in the invention preferably includes supplying a carbon source, together with the nitrogen source, to the heating apparatus in order to coat each silicon active material particle with a carbon coating simultaneously with allowing each silicon active material particle to contain nitrogen.

In this manner, the nitrogen introducing process can be performed at the same time as the above process of forming the carbon coating to improve the battery characteristics by the conductive silicon active material particles. This makes the producing method easy to perform and significantly improves productivity.

The inventive producing method can be performed in the above manner to produce the inventive negative electrode material for a lithium-ion secondary battery.

The inventive negative electrode material (negative electrode active material), for a lithium-ion secondary battery, using the above silicon active material particles is used to produce the inventive negative electrode and the inventive lithium-ion secondary battery.

Negative Electrode

When a negative electrode is produced with the inventive negative electrode material for a lithium-ion secondary battery, a conductive additive such as carbon or graphite may be added to the negative electrode material. The conductive additive is not particularly limited; any electronic conductive material that neither decomposes nor transmutes when a battery produced with this material is used suffices for the conductive additive. Specific examples of the conductive additive include powder or fiber of metal such as Al, Ti, Fe, Ni, Cu, Zn, Ag, Sn, and Si, and graphite such as natural graphite, synthetic graphite, various types of coke powder, mesophase carbon, vapor-grown carbon fiber, pitch-based carbon fiber, polyacrylonitrile(PAN) based carbon fiber, and various types of sintered resin.

An example of a method of preparing a negative electrode (a product) is given as follows.

The negative electrode material is mixed with a solvent such as N-methylpyrrolidone or wafer, together with as necessary a conductive additive and other additives such as a binder, e.g., a polyimide resin binder, to form paste-like mixture. This mixture is applied to a sheet current collector. The current collector may be made of a material typically used for a negative-electrode current collector, such as copper foil or nickel foil, which can be used without any limitation such as its thickness or surface treatment.

The procedure for forming the paste-like mixture into a sheet is not particularly limited; known methods may be used.

Lithium-Ion Secondary Battery

The inventive lithium-ion secondary battery includes a positive electrode, a negative electrode, a lithium ion conducting non-aqueous electrolyte. The negative electrode is produced with the inventive negative electrode material for a lithium-ion secondary battery. In other words, one of the features of the inventive lithium-ion secondary battery is to include a negative electrode made of a negative electrode material including silicon active material particles each containing nitrogen in the range from 100 ppm to 50,000 ppm. Other materials for the positive electrode, the electrolyte, a separator, and so on, and the battery shape are not limited in particular; known materials may be used. As described previously, the inventive negative electrode material provides better battery characteristics such as higher charging and discharging capacity and cycle performance, in particular, excellent cycle durability when used for a lithium-ion secondary battery.

Lithium, a chalcogen compound, a transition metallic compound such as $LiCoO_2$, $LiNiO_2$, $LiMn_2O_4$, $V_2O_5$, $MnO_2$, $TIS_2$, and $MoS_2$ may be used as a positive electrode active material.

Examples of the electrolyte include a non-aqueous solution containing lithium salt such as lithium hexafluorophosphate or lithium perchlorate. Examples of the non-aqueous solution include propylene carbonate, ethylene carbonate, diethyl carbonate, dimethoxyethane, γ-butyrolactone, 2-methyltetrahydrofuran, and a mixture thereof. In addition to these solutions, various solid electrolytes and other non-aqueous electrolytes may be used.

EXAMPLES

The present invention will be more specifically described below with reference to examples and comparative examples, but is not restricted to these examples.

Example 1

After SiOx powder, where x=1.0, was roughly pulverized with a jaw crusher (made by Maekawa Kogyosho Co., Ltd.), the resultant was pulverized for 4 hours with a ball mill (made by MAKINO Corp.) to obtain SiO particles having a median diameter $D_{50}$ of 4.5 μm.

The SiO particles were spread on a tray such that the thickness of a layer of the particles became 10 mm, and placed in a batch furnace together with the tray. The temperature in the furnace was increased to 1000° C. at a heating rate of 200° C./hour. Right after the furnace temperature reached 1000° C., a methane gas and a nitrogen gas were supplied as a premixed gas to the interior of the furnace at a supply rate of 0.2 L/min and 0.5 L/min, respectively. The gas supply was then stopped, the furnace temperature was decreased, and the interior of the furnace was cooled. Through these processes, 106 g of black silicon active material particles were obtained.

The obtained silicon active material particles were conductive particles each containing a carbon coating. The ratio of the mass of the carbon coating to the total mass of the particle including the carbon coating was 4.8 mass %.

An oxygen and nitrogen analyzing apparatus, EMGA-930 (made by HORIBA Ltd.), was used to measure the nitrogen content of the silicon active material particle by the thermal-conductivity-based method. The nitrogen content was 1700 ppm.

Battery Evaluation

A battery produced with the obtained silicon active material particles was then evaluated as follows.

First, a mixture was produced with 45 mass % of the obtained silicon active material particles, 45 mass % of synthetic graphite having an average particle size of 10 μm, 10 mass % of polyimide. The mixture was then mixed with N-methylpyrrolidone to form a slurry.

The slurry was applied to 12-μm-thickness copper foil and dried at 80° C. for 1 hour. The resultant foil was pressed with a roller press to form an electrode. The electrode was dried under a vacuum at 350° C. for 1 hour. The electrode was then die-cut into a 2-cm² negative electrode.

Next, an evaluation lithium-ion secondary battery was produced to evaluate the charging and discharging characteristics of the obtained negative electrode; the production of this secondary battery used a lithium foil positive electrode, non-aqueous electrolyte composed of a mixed solution having an ethylene carbonate-to-diethyl carbonate volume ratio of 1:1 and 1 mole/L of lithium hexafluorophosphate dissolved in the solution, a 30-μm-thickness separator made of a polyethylene microporous film.

The produced lithium-ion secondary battery was left at room temperature a night, and then charged with a constant current of 0.5 mA/cm² by a secondary battery charging and discharging tester (made by NAGANO K.K) until the voltage of the test cell reached 0V. After this voltage reached 0V, the charging was continued while the current was decreased such that the voltage of the test cell kept 0V. When the current was decreased to less than 40 μA/cm², the charging was terminated. The battery was then discharged with a constant current of 0.5 mA/cm² until the voltage reached 1.4V to measure the discharging capacity.

Finally, the above charging and discharging cycle was repeated until the total number of cycles reached 50 cycles. The charging and discharging test of the evaluation lithium-ion secondary battery after 50 cycles was carried out.

The result is given in Table 1. This result was that the first discharge capacity was 1732 mAh/g, and the capacity maintenance rate (also referred to as cycle maintenance rate) after 50 cycles was 94%. This result revealed that the lithium-ion secondary battery had high capacity and excellent cycle performance.

Example 2

The same SiOx powder, where x=1.0, was subjected to the carbon coating and nitrogen introducing processes as in example 1 except that the furnace temperature was increased to 900° C. and the supply time of the methane-nitrogen mixed gas was 14 hours. The obtained silicon active material particles were conductive particles each containing a carbon coating. The ratio of the mass of the carbon coating to the total mass of the particle including the carbon coating was 4.8 mass %. The particle contained 300 ppm of nitrogen. These silicon active material particles were used to produce a negative electrode to evaluate a battery as in example 1.

The result was that the first discharge capacity was 1730 mAh/g, and the capacity maintenance rate after 50 cycles was 92%. This result revealed that the lithium-ion secondary battery had high capacity and excellent cycle performance.

Example 3

The same SiOx powder, where x=1.0, was subjected to the carbon coating and nitrogen introducing processes as in example 1 except that these processes was performed in a rotary kiln (NORITAKE Co., Limited) at 1000° C. while the powder was supplied at a rate of 1 kg/hour to the kiln. The kiln rotational speed was 0.5 rpm. The methane gas was supplied at a supply rate of 5 L/min; the nitrogen gas 25 L/min. The obtained silicon active material particles were conductive particles each containing a carbon coating. The ratio of the mass of the carbon coating to the total mass of the particle including the carbon coating was 5.0 mass %. The particle contained 1500 ppm of nitrogen. These silicon active material particles were used to produce a negative electrode to evaluate a battery as in example 1.

The result was that the first discharge capacity was 1758 mAh/g, and the capacity maintenance rate after 50 cycles was 93%. This result revealed that the lithium-ion secondary battery had high capacity and excellent cycle performance.

Example 4

The same SiOx powder, where x=1.0, was subjected to the carbon coating and nitrogen introducing processes as in example 1 except that the methane gas was supplied at a supply rate of 0.2 L/min and the nitrogen gas 0.3 L/min.

The obtained silicon active material particles were conductive particles each containing a carbon coating. The ratio of the mass of the carbon coating to the total mass of the particle including the carbon coating was 4.8 mass %. The particle contained 100 ppm of nitrogen. These silicon active material particles were used to produce a negative electrode to evaluate a battery as in example 1.

The result was that the first discharge capacity was 1760 mAh/g, and the capacity maintenance rate after 50 cycles was 90%. This result revealed that the lithium-ion secondary battery had high capacity and excellent cycle performance.

Example 5

The same SiOx powder, where x=1.0, was subjected to the carbon coating and nitrogen introducing processes as in example 1 except that the furnace temperature was increased to 1050° C., the gas supply time was 4 hours, the methane gas was supplied at a supply rate of 0.1 L/min and the nitrogen gas 0.5 L/min.

The obtained silicon active material particles were conductive particles each containing a carbon coating. The ratio of the mass of the carbon coating to the total mass of the particle including the carbon coating was 5.1 mass %. The particle contained 10,000 ppm of nitrogen. These silicon active material particles were used to produce a negative electrode to evaluate a battery as in example 1.

The result was that the first discharge capacity was 1725 mAh/g, and the capacity maintenance rate after 50 cycles was 90%. This result revealed that the lithium-ion secondary battery had high capacity and excellent cycle performance.

Example 6

The same SiOx powder, where x=1.0, was subjected to the carbon coating and nitrogen introducing processes as in example 1 except that the furnace temperature was increased to 1100° C., the gas supply time was 3 hours, the methane gas was supplied at a supply rate of 0.1 L/min and the nitrogen gas 0.5 L/min. The obtained silicon active material particles were conductive particles each containing a carbon coating. The ratio of the mass of the carbon coating to the total mass of the particle including the carbon coating was 5.0 mass %. The particle contained 50,000 ppm of nitrogen. These silicon active material particles were used to produce a negative electrode to evaluate a battery as in example 1.

The result was that the first discharge capacity was 1706 mAh/g, and the capacity maintenance rate after 50 cycles was 91%. This result revealed that the lithium-ion secondary battery had high capacity and excellent cycle performance.

Comparative Example 1

The same SiOx powder, where x=1.0, was subjected to a carbon coating process as in example 1 except that the process was performed while a methane gas and an argon gas were supplied as a premixed gas at a supply rate of 0.2 L/min and 0.5 L/min, respectively. Unlike the examples, no nitrogen introducing process was performed.

The obtained silicon active material particles were black conductive particles each containing a carbon coating. The ratio of the mass of the carbon coating to the total mass of the particle including the carbon coating was 4.9 mass %. The particle contained less than 100 ppm of nitrogen. This nitrogen content was less than the lower detection limit. These silicon active material particles were used to produce a negative electrode to evaluate a battery as in example 1.

The result was that the first discharge capacity was 1740 mAh/g, and the capacity maintenance rate after 50 cycles was 84%. This result revealed that the lithium-ion secondary battery had as high capacity as the examples, but poor cycle performance than in the examples.

Comparative Example 2

The same SiOx powder, where x=1.0, was subjected to a carbon coating process with a rotary kiln as in example 3 except that the process was performed while a methane gas was supplied at a supply rate of 5 L/min and an argon gas 25 L/min. Unlike the examples, no nitrogen introducing process was performed.

The obtained silicon active material particles were black conductive particles each containing a carbon coating. The ratio of the mass of the carbon coating to the total mass of the particle including the carbon coating was 5.1 mass %. The particle contained less than 100 ppm of nitrogen. This nitrogen content was less than the lower detection limit. These silicon active material particles were used to produce a negative electrode to evaluate a battery as in example 1.

The result was that the first discharge capacity was 1751 mAh/g, and the capacity maintenance rate after 50 cycles was 85%. This result revealed that the lithium-ion secondary battery had as high capacity as the examples, but poor cycle performance than in the examples.

Comparative Example 3

The same SiOx powder, where x=1.0, was subjected to the carbon coating and nitrogen introducing processes as in example 1 except that the furnace temperature was 1150° C. and the gas supply time was 3 hours, and the processes were performed while a methane gas and a nitrogen gas were supplied as a premixed gas at a supply rate of 0.1 L/min and 0.5 L/min, respectively. The obtained silicon active material particles were black conductive particles each containing a carbon coating. The ratio of the mass of the carbon coating to the total mass of the particle including the carbon coating was 5.2 mass %. The particle contained 55,000 ppm of nitrogen. These silicon active material particles were used to produce a negative electrode to evaluate a battery as in example 1.

The result was that the first discharge capacity was 1670 mAh/g, and the capacity maintenance rate after 50 cycles was 88%. This result revealed that the lithium-ion secondary battery had lower battery capacity than in the examples.

Table 1 shows the summary of the results in the examples and comparative examples.

TABLE 1

|  | NITROGEN CONTENT (ppm) | FIRST DISCHARGE CAPACITY (mAh/g) | FIRST CHARGE AND DISCHARGE EFFICIENCY (%) | CAPACITY MAINTENANCE RATE AFTER 50 CYCLES (%) |
|---|---|---|---|---|
| EXAMPLE 1 | 1700 | 1732 | 77.2 | 94 |
| EXAMPLE 2 | 300 | 1730 | 77.0 | 92 |
| EXAMPLE 3 | 1500 | 1758 | 77.5 | 93 |
| EXAMPLE 4 | 100 | 1760 | 77.0 | 90 |
| EXAMPLE 5 | 10000 | 1725 | 77.5 | 90 |
| EXAMPLE 6 | 50000 | 1706 | 77.8 | 91 |
| COMPARATIVE EXAMPLE 1 | <100 | 1740 | 77.1 | 84 |
| COMPARATIVE EXAMPLE 2 | <100 | 1751 | 76.8 | 85 |
| COMPARATIVE EXAMPLE 3 | 55000 | 1670 | 77.5 | 88 |

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A negative electrode material for a lithium-ion secondary battery, the negative electrode material comprising
    silicon active material particles containing silicon and nitrogen, the silicon active material particles being capable of occluding and emitting lithium ions, wherein
    an amount of the nitrogen contained in each silicon active material particle is in the range from 100 ppm to 1,700 ppm, and wherein
    each silicon active material particle is coated with a carbon coating.

2. The negative electrode material for a lithium-ion secondary battery according to claim 1, wherein the silicon active material particles are selected from the group consisting of silicon particles, particles with composite structure in which silicon fine particles are dispersed into a silicon compound, silicon oxide particles expressed by a general formula of $SiO_x$ where $0.5 \leq x \leq 1.6$, and a mixture of two or more thereof.

3. The negative electrode material for a lithium-ion secondary battery according to claim 1, wherein the silicon active material particles are subjected to chemical vapor deposition to deposit carbon thereon at a temperature ranging from 600° C. to 1200° C. under an organic gas and/or steam atmosphere capable of producing carbon by pyrolysis, whereby each silicon active material particle is coated with the carbon coating.

4. The negative electrode material for a lithium-ion secondary battery according to claim 3, wherein the organic gas and/or steam atmosphere capable of producing carbon by pyrolysis is made of at least one raw material selected from the group consisting of methane, ethane, ethylene, acetylene, propane, butane, butene, pentane, isobutane, hexane, benzene, toluene, xylene, styrene, ethylbenzene, diphenylmethane, naphthalene, phenol, cresol, nitrobenzene, chlorobenzene, indene, cumarone, pyridine, anthracene, phenanthrene, a gas light oil obtained by a tar distillation process, a creosote oil, an anthracene oil, and a naphtha-cracked tar oil.

5. A negative electrode for a lithium-ion secondary battery comprising a negative electrode material according to any one of claim 1.

6. A lithium-ion secondary battery comprising a negative electrode according to claim 5.

7. The negative electrode material for a lithium-ion secondary battery according to claim 1, wherein the silicon active material particles comprise silicon oxide particles expressed by a general formula of $SiO_x$ where $0.5 \leq x \leq 1.6$.

8. The negative electrode material for a lithium-ion secondary battery according to claim 7, wherein $x=1$.

* * * * *